Patented June 16, 1953

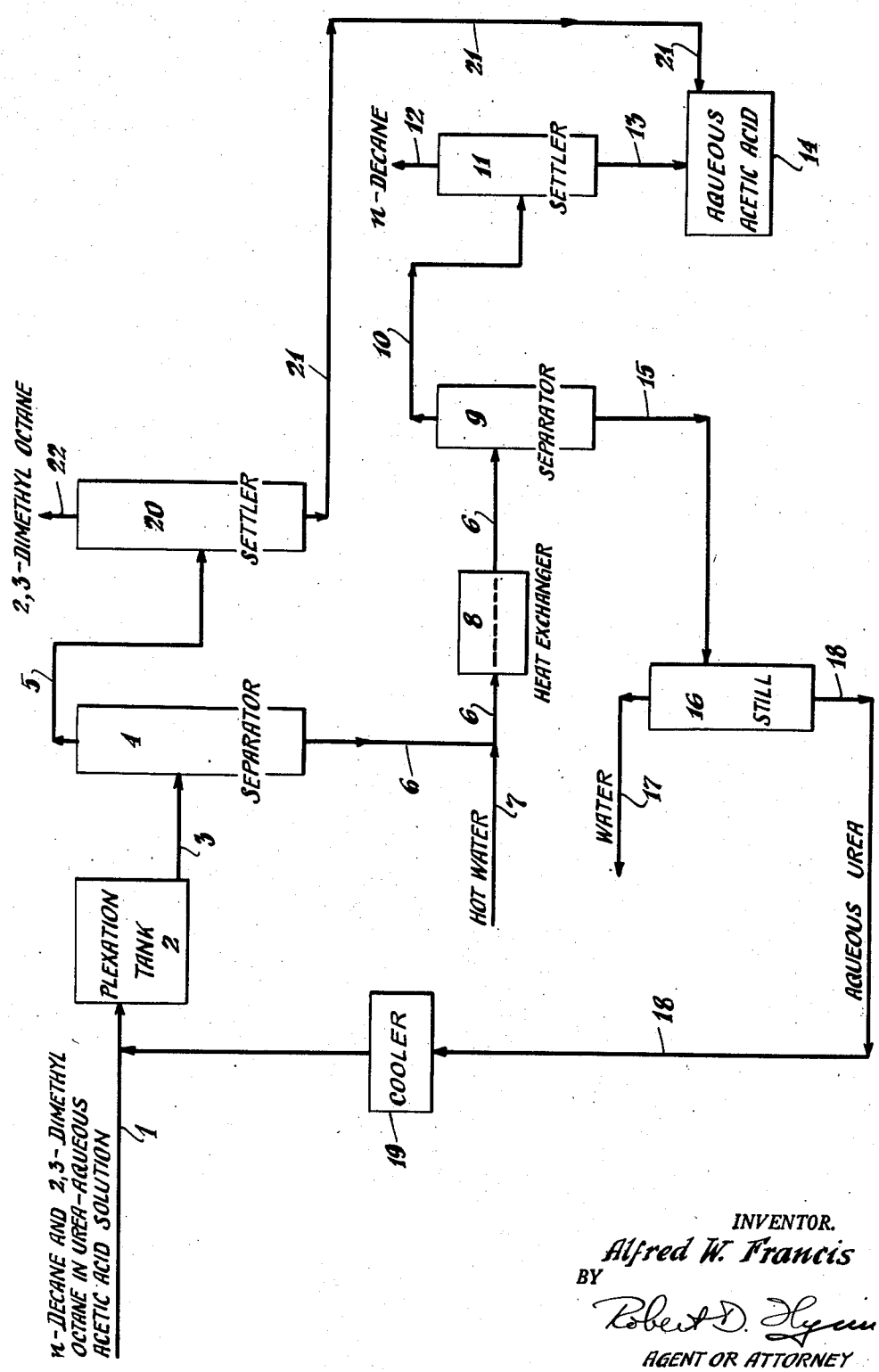

2,642,421

UNITED STATES PATENT OFFICE 2,642,421

SEPARATION OF HYDROCARBONS AND HYDROCARBON DERIVATIVES

Alfred W. Francis, Woodbury, N. J., assignor to Socony-Vacuum Oil Company, Incorporated, a corporation of New York Application September 13, 1949, Serial No. 115,396

10 Claims. (Cl. 260—96.5)

This invention has to do with the separation of hydrocarbons and hydrocarbon derivatives of different molecular configuration from mixtures containing the same.

I. FIELD OF INVENTION

Numerous processes have been developed for the separation of hydrocarbons and hydrocarbon derivatives of different molecular configuration by taking advantage of their selective solubility in selected reagents or solvents from which they may later be separated. Exemplary of hydrocarbon separation procedures is the Edeleanu process, wherein paraffinic materials are separated from aromatics by virtue of the greater solubility of aromatics in liquid sulfur dioxide. Lubricant oil solvent refining processes, solvent deasphalting, solvent dewaxing and the like are further examples of the separation of hydrocarbons of different molecular configuration. Typical of selective solvent procedures for separating hydrocarbon derivatives is the separation of paraffin wax, monochlorwax and polychlorwaxes, with acetone as the selective solvent.

This invention is concerned with the general field outlined above, but based upon a different and little-known phenomenon, namely, the differing ability of hydrocarbons and hydrocarbon derivatives to enter into and to be removed from certain crystalline complexes. As used herein, the term "complex" broadly denotes a combination of two or more compounds.

This invention is predicated upon the knowledge that urea and thiourea form complex crystalline compounds to a varying degree with various forms of hydrocarbons and hydrocarbon derivatives.

II. PRIOR ART

For some years it has been known that various isomers of aromatic hydrocarbon derivatives form complexes with urea. Kremann (Monatshefte f. Chemie 28, 1125 (1907)) observed that complexes, designated as "double compounds," of urea and the isomeric cresols are stable at different temperatures. Schotte and Priewe (1,830,859) later separated meta-cresol from the corresponding para isomer by selectively forming a meta-cresol-urea complex, which was described as an "addition compound;" the latter compound was separated from the para isomer and then split up by distillation or with water or acid to obtain pure meta-cresol. The "addition compound" of meta-cresol and urea was shown thereafter to have utility as a disinfectant (Priewe 1,933,757). Bentley and Catlow (1,980,- 901) found a number of aromatic amines containing at least one basic amino group capable of forming "double compounds" with certain isomeric phenols. It has also been shown that trans-oestradiol can be separated from the corresponding cis-compound by forming a difficultly soluble compound of urea and trans-oestradiol (Priewe 2,300,134).

The forces between urea and the compounds of the foregoing complexes are due to specific chemical interaction between the functional groups.

One heterocyclic compound, 2:6 lutidine, has been found to form a crystalline compound with urea, thus affording a means of separating the lutidine from beta- and gamma - picolines (Riethof 2,295,606).

Comparatively few aliphatic hydrocarbon derivatives have been known to date to form complex compounds with urea. In German patent application B 190,197, IV d/12 (Technical Oil Mission, Reel 143; Library of Congress, May 22, 1946), Bengen described a method for the separation of aliphatic oxygen-containing compounds (acids, alcohols, aldehydes, esters and ketones) and of straight chain hydrocarbons of at least six carbon atoms from mixtures containing the same, the method being predicated upon the ability of such compounds and hydrocarbons to form "Additions-Produkt" with urea. A mixture containing such aliphatic compounds is contacted with a concentrated solution of urea in water, methanol, or ethanol, and the like. In the Technical Oil Mission translation of the Bengen application, however, the urea complexes were designated "adducts," which term apparently stems from the anglicized "*add*ition prod*uct*." The "adducts" are separated into their components, urea and straight chain hydrocarbon or aliphatic oxygen-containing compound, by heating or by the addition of methanol, water or an aqueous solution.

Thiourea has also been known to form complexes, perhaps the first of which is a complex with ethyl oxalate (Nencki, Berichte 7, 780 (1874)). Recently, crystalline molecular complexes of thiourea and certain organic compounds were described by Angla (Compt. rendus 224, 402–4 and 1166 (1947)). The organic compounds recited include cyclic hydrocarbons such as cyclohexane, cyclohexene, polycyclic terpenes; halides, alcohols and ketones of such cyclic hydrocarbons; and halides of short chain paraffins. Crystalline molecular complexes of such compounds are dissociated by water and organic solvents to their components, thiourea and a compound of the foregoing type.

III. DEFINITIONS

From the foregoing discussion of prior art (II), it will be clear that a variety of terms have been applied to urea and thiourea complexes. The latter have been rather loosely described as "double compounds," "addition compounds," "difficultly soluble compounds," "Additions-Produkt," "adducts," and "crystalline molecular complexes." All of these terms are somewhat ambiguous in that they have also been used to describe products or complexes of different character than the urea complexes under consideration. This is particularly so with the term "adduct," and the related term "unadducted material." While the term "adduct" is simple and convenient, it is an unfortunate designation, inasmuch as it confuses these complexes with other substances known in the chemical art. Specifically, "adduct" has been applied to Diels-Alder reaction products, formed by reaction of conjugated diolefins and olefins and their derivatives. As is well known, Diels-Alder products, as a rule, do not revert to their original constituents when heated or treated with water, acids, solvents, etc. Moreover, the term "adduct" has been defined earlier as "The product of a reaction between molecules, which occurs in such a way that the original molecules or their residues have their long axes parallel to one another." (Concise Chemical and Technical Dictionary). Further ambiguity is introduced by the term "adduction," which has been defined as "oxidation." (Hackh).

To avoid the foregoing conflicting terminology, several related terms have been coined to define with greater specificity the substances involved in the phenomenon under consideration. As contemplated herein and as used throughout the specification and appended claims, the following terms identify the phenomenon:

Plexad—a revertible associated complex comprising a plexor, such as urea, and at least one other compound; said plexad characterized by reverting or decomposing, under the influence of heat and/or various solvents, to its original constituents, namely, a plexor and at least one plexand.

Plexand—a compound capable of forming a plexad with a plexor, such as urea and thiourea; compounds of this character differ in their capacity to form plexads, depending upon various factors described hereinafter.

Antiplex—a compound incapable of forming a plexad with a plexor.

Plexor—a compound capable of forming a plexad with a plexand; such as urea and thiourea.

Plexate—to form a plexad.

Plexation—the act, process or effect of plexating.

IV. OUTLINE OF INVENTION

It has now been found that the separation procedures used hitherto can be improved substantially by the use of certain solvents with a plexor.

As indicated above, urea plexads and thiourea plexads have been formed by contacting a mixture containing a plexand and an antiplex, with urea or thiourea carried in water or an alcohol solution, whereupon a urea or thiourea plexad was formed. The plexad was then separated from the antiplex by decantation, filtration or similar means, and the plexad was decomposed into its components by heating or by contact with a suitable solvent.

Plexation procedures of the foregoing character, however, are subject to one or more shortcomings. For example, the solubility of urea and/or thiourea in various solvents is not as high as desired, thus reducing the opportunity for complete reaction or plexation. The solubility of urea in methanol, by way of illustration, is only of the order of 23 per cent by weight at 25° C., and with water is about 54 per cent. In addition, relatively slow reaction rates characterize certain of the urea-solvent and/or thiourea-solvent systems previously used, possibly because of the extremely low solubility of hydrocarbons in water. While methanol solutions react faster than water solutions, urea is depleted much faster because of the lower concentrations of urea in methanol, and since plexation is reversible, the extent of reaction is limited unless excessive amounts of urea solution are used.

The shortcomings of previous plexation procedures have now been overcome by using certain aqueous acetic acid solutions as the urea or thiourea solvents.

In some manner, as yet not thoroughly understood, certain aqueous acetic acid solutions cooperate with the plexor to provide a more effective plexation. By way of speculation, and in no sense a limitation upon the subject matter described and claimed herein, it is possible that the following factors are involved. As an organic liquid, acetic acid dissolves some hydrocarbon, for example, and thus greatly increases its solubility and, therefore, its reactivity in an aqueous solution. But, unlike neutral solvents such as methanol, acetic acid does not greatly decrease the solubility of urea in aqueous solutions, since it forms the highly soluble and reactive urea diacetate. Anhydrous acetic acid dissolves only about 11 per cent of urea at 25° C., but an 87.5 per cent acetic acid solution in urea dissolves over 40 per cent of urea at 25° C. Solutions recommended herein vary from about 20 per cent to about 88 per cent acetic acid at 25° C., with a 50 per cent solution providing excellent results. The latter solution dissolves about 50 per cent of urea, that is, the solution contains 50 per cent of urea, 25 per cent of acetic acid and 25 per cent of water.

Organic acids in addition to acetic acid can be used advantageously herein, including: citric, tartaric, formic, propionic and oxalic. Mineral acids, such as hydrochloric, sulfuric and nitric, augment the solubility of urea in aqueous solutions, but they have not been found efficacious herein because the resulting high hydrogen ion concentration appears to inhibit the plexation in part if it is more than one-tenth normal in concentration, and to inhibit the plexation completely if it is more than one normal in concentration. A hydrogen ion concentration of at least about $10^{-3}$ appears to be necessary to augment the solubility of urea, but should not be greater than about $10^{-1}$ to avoid an inhibiting effect upon the plexation.

V. OBJECTS

It is an object of this invention, therefore, to provide an effective means for separating hydrocarbons and hydrocarbon derivatives of different molecular configuration from mixtures containing the same.

It is also an object of this invention to separate a plexand from an antiplex, and to provide a plexand substantially free of an antiplex.

Another important object is the provision of a continuous method of separation of said plexands and antiplexes, which method is flexible, capable of relatively sharp separation, and not highly demanding of attention and of utilities such as heat, refrigeration, pumping power and the like.

Other objects and advantages of the invention will be apparent from the following description.

VI. INVENTION IN DETAIL

As indicated above, it has been found that the foregoing objects are achieved by plexation with urea or thiourea of a plexand or plexands, the urea or thiourea used being carried in an aqueous acetic acid medium.

(1) Plexands and mixtures suitable for plexation

The hydrocarbon mixtures and oxygen-containing paraffin mixtures mentioned in the discussion of the prior art, above, are contemplated herein. So also are the compounds, plexands, shown therein to have the capacity to form plexads. This is subject to the condition that the compounds present in such mixtures are substantially inert, chemically, to the aqueous organic acid solutions, and particularly acetic acid solutions. For example, when urea is used as a plexor, the mixture used may be: isomeric cresols (Kremann; Schotte and Priewe); oestradiols (Priewe); lutidine-picolines (Riethof); hydrocarbons containing straight chain hydrocarbons of at least six carbon atoms per molecule, and oxygen-containing mixtures containing straight chain acids, alcohols, aldehydes, esters and/or ketones having at least six carbon atoms per molecule (Bengen). It will be apparent from the definitions recited above, that the plexands of these mixtures are the compounds forming plexads with urea, and that the antiplexes are the compounds which do not form urea plexads or form such plexads less readily than the plexands.

Hydrocarbon mixtures containing n-paraffins in the range of $C_7$—$C_{30}$ and higher, such as wax distillates, foots oil, gas oils, virgin kerosenes, straight run naphthas are also suitable when urea is used as the plexor, such mixtures being shown in copending application Serial No. 4,997, filed January 29, 1948. Other mixtures shown in the latter application and also suitable here are: hydrocarbon mixtures containing n-paraffins and n-olefins, are prepared by synthesis with carbon monoxide and hydrocarbons, i. e., typical Fischer-Tropsch products prepared using cobalt and iron catalysts; cracked mixtures prepared by the vapor phase cracking of stocks rich in n-paraffins, such as by the cracking of paraffinic gas oils, foots oil, crude waxes, etc.; mixtures containing straight chain oxygenated compounds, such as acids, alcohols, aldehydes and esters, and containing branched compounds, such as those obtained by synthesis from hydrogen and carbon monoxide over an iron catalyst or by oxidation of high molecular weight hydrocarbons; mixtures consisting essentially of n-paraffins and n-olefins, for the n-paraffins form stronger plexads than the n-olefins; mixtures consisting essentially of n-olefins with the double bond in various positions, for the olefins having the double bond near the end of the chain form stronger plexads than those having the double bond further from the end of the chain; hydrocarbon mixtures obtained by isomerization, alkylation, dehydrocyclization, dehydrogenation, etc.

Other mixtures which may be more effectively plexated with urea by the present process are those containing hydrocarbon derivatives and shown in application Serial No. 115,511, filed concurrently herewith. Typical of the mixtures described in the latter application are mixtures containing a straight chain halide having the halogen atom attached to a terminal carbon and having at least about five carbons in the chain. Mixtures containing compounds characterized by a nitrogen-containing substituent, are also advantageously plexated with the present process subject to the proviso that the nitrogen-containing compounds present therein are insufficiently basic in character to react as a base with acetic acid; such mixtures include amides, nitriles, nitroparaffins, etc. and are described in application Serial No. 115,515, filed concurrently herewith. Sulfur-containing compounds present in various mixtures are also plexated efficiently herein; those are shown in application Serial No. 115,516, filed concurrently herewith, now abandoned. Compounds containing cyclic substituents, present in various mixtures, are also efficiently plexated with urea in the present process, being shown in application Serial No. 116,593, filed concurrently herewith. Plexation with urea of various terminally substituted compounds from mixtures containing the same and non-terminally substituted compounds, described in application Serial No. 115,517, filed concurrently herewith, is also aided materially by the present process.

Urea plexation of a non-terminally mono-substituted compound from mixtures containing the same and a non-terminally poly-substituted compound, described in application Serial No. 115,513, filed concurrently herewith, is also improved substantially by the present process. Similarly, more effective resolution with urea of mixtures containing paraffinic compounds of different degrees of unsaturation is realized herein; these mixtures are described in detail in applications Serial Nos. 115,514 and 115,518, filed concurrently herewith.

With regard to thiourea plexation, the mixtures shown in applications Serial Nos. 115,512 and 115,730, filed September 13 and 14, 1949, respectively are suitable in the present process. In application Serial No. 115,512, highly branched paraffins and/or highly branched olefins are separated from straight chain or less highly branched compounds. In application Serial No. 115,730, certain cycloparaffins and/or cyclo-olefins are separated from mixtures of the same and other hydrocarbons.

(2) Plexor

The plexors used herein include urea and thiourea and, as indicated above, these plexors are used in organic acids, particularly in aqueous acetic acids, of certain concentrations. These solutions should range from partially saturated to supersaturated at the temperature at which they are contacted with a plexand or with a mixture containing one or more plexands and antiplexes. In many cases, it will be found convenient to suspend a further supply of urea or thiourea crystals in the solution, handling it as a slurry.

Acid solutions contemplated herein are substantially inert to the hydrocarbons and/or hydrocarbon derivatives under treatment, and to urea or thiourea. They are heat stable, except to form salts with urea and thiourea, which salts are still reactive in plexation, both alone and in contact with the hydrocarbons, and hydrocarbon derivatives, at temperatures at which the desired plexad is not heat stable.

The acid solutions can be used alone or with another solvent, provided the latter is not so basic as to form salts with the acid. It is often advantageous to utilize (particularly when the plexad is separated by gravity) a multi-component solvent system, with the acid solutions in combination with: alcohols, glycols, ethers, acids, amides, nitriles, etc. Typical of such solvents are: methanol, ethanol, propanol, ethylene glycol, butylene glycols, ethylene glycol dimethyl ether, formamide, formic acid, acetonitrile, etc. Such multi-component solvents, partially saturated to supersaturated with urea or thiourea, lend themselves readily to a continuous process for separation by plexation.

It is also contemplated herein to include a small quantity of a surface active agent in the urea or thiourea solution, in the manner described in copending application Serial No. 115,-437, filed concurrently herewith.

Another modification contemplated herein is the procedure described in copending application Serial No. 137,739, filed January 10, 1950, involving contact of hydrocarbons and/or hydrocarbon derivatives with a plexor impregnated upon a porous support. In this modification, the solvents used with the hydrocarbon and/or hydrocarbon derivatives will be acid solutions such as described herein.

An understanding of a preferred embodiment of this invention may be facilitated by reference to the accompanying illustrative drawing, Figure 1, which is a schematic flow-diagram of one specific arrangement for practicing the invention.

In Figure 1, a mixture of hydrocarbons such as n-decane and 2,3-dimethyl octane and a urea-aqueous acetic acid solution, is introduced through line 1 to plexation tank 2. The mixture in tank 2 is agitated for a suitable period of time, generally from several minutes to about three hours, at a suitable temperature, for example 25° C., in order to realize a satisfactory degree of plexation. It will be understood that plexation tank 2 is equipped with a suitable stirrer or agitator (not shown). The resulting mixture is taken from tank 2 through line 3, to separator 4. The separator, 4, can be a centrifuge, filter, settler equipped with a suitable screw conveyor, etc. as will be understood by those skilled in the art.

Antiplex (2,3-dimethyl octane), together with some aqueous acetic acid, is withdrawn from separator 4 through line 5; and urea-n-decane plexad, together with some aqueous acetic acid, is withdrawn through line 6. The urea-n-decane plexad in line 6 is contacted with hot water (at about 70° C.) which is added through line 7, and is passed through heat exchanger 8 to separator 9. The heat exchanger 8 is maintained at about 70° C., such that the urea-n-decane plexad is decomposed or resolved. n-Decane is removed from separator 9 through line 10 and is introduced into settler 11. n-Decane is removed from settler 11 through line 12. Aqueous acetic acid removed through line 10 to settler 11 with the n-decane is taken to tank 14 through line 13. Recovered aqueous acetic acid stored in tank 14 can be recycled through line 1.

From separator 9, aqueous urea is taken through line 15 to a tower or still 16 wherein urea is concentrated. Water is removed through line 17, and a concentrated aqueous urea is removed through line 18, and is taken through cooler 19 to line 1 for reuse.

2,3-Dimethyl octane, together with some aqueous acetic acid in line 5, is introduced into settler 20, and aqueous acetic acid is removed through line 21 to tank 14. Recovered aqueous acetic acid can be recycled as indicated above. 2,3-Dimethyl octane is removed through line 22.

As shown above, a urea-n-decane plexad can be decomposed or resolved to urea and n-decane, under the influence of water and heat. Plexads, by definition, can be so resolved under the influence of heat and/or certain solvents, such as methanol, ethanol, water and others mentioned above.

VI. ILLUSTRATIVE EXAMPLES

Several illustrative examples are provided by the following. Ten parts, by volume, of concentrated urea solution and two parts, by volume, of a n-paraffin were stirred vigorously at 25° C. in a reaction vessel. The extent of reaction was indicated by the temperature rise and the reaction speed was indicated by the time required for such temperature increase. Results of these examples are set forth in the table.

| Urea Solution (Parts by Weight) | | | Original Acetic Acid (Percent by Weight) | n-Paraffin | Time (Minutes) | Temperature Rise (°C.) |
| Urea | Acetic Acid | Water | | | | |
| --- | --- | --- | --- | --- | --- | --- |
| 54 | | 46 | 0 | n-Octadecane | 7.0 | 6.9 |
| 54 | 15 | 31 | 33 | ___do___ | 1.0 | 7.9 |
| 50 | 28 | 22 | 56 | ___do___ | 0.5 | 8.5 |
| 54 | 15 | 31 | 33 | n-Decane | 2.0 | 5.0 |
| 54 | 15 | 31 | 33 | n-Octane | 3 | 3.2 |
| 53 | 24 | 23 | 51 | ___do___ | 2 | 4.7 |
| 50 | 28 | 22 | 56 | ___do___ | 1.5 | 3.2 |

It is to be noted that the foregoing results were obtained by using an operating temperature of about 25° C. It is to be understood, however, that plexation can be effected at higher or lower temperatures. For example, at temperatures of about 40° C. anhydrous acetic acid can be used. At temperatures of the order of 40° C., acetic acid solutions range from about 20 weight per cent to anhydrous or glacial acetic acid. Correspondingly, at lower temperatures, as at about 10° C., the range of concentration is advantageously from about 20 weight per cent to about 70 weight per cent.

I claim:

1. In the separation of a compound (I) having the capacity to form a crystalline complex with a complex-forming agent selected from the group consisting of urea and thiourea, from a mixture containing said compound (I) and a compound (II) incapable of forming a crystalline complex with the same said agent, whereby said compound (I) preferentially forms a complex with said agent, and wherein said complex and compound (II) are separated, the improvement which comprises: so contacting said mixture and said agent in an aqueous acetic acid medium determined by those containing from about 20 per cent by weight of acetic acid to about 70 per cent by weight when said contact is affected at about 10° C., to about 88 per cent by weight when said contact is affected at about 25° C., and to 100 per cent by weight when said contact is affected at about 40° C.

2. In the separation of a compound (I) having the capacity to form a crystalline complex with a complex-forming agent selected from the group consisting of urea and thiourea, from a mixture containing said compound (I) and a compound (II) incapable of forming a crystalline complex with the same said agent, whereby said compound (I) preferentially forms a complex with said agent, and wherein said complex and compound (II) are separated, the improvement which comprises: so contacting said mixture and said agent in an aqueous acetic acid medium containing about 50 per cent by weight of acetic acid.

3. In the separation of a compound (I) having the capacity to form a crystalline complex with urea, from a mixture containing said compound (I) and a compound (II) incapable of forming a crystalline complex with urea, whereby said compound (I) preferentially forms a complex with urea, and wherein said complex and compound (II) are separated, the improvement which comprises: so contacting said mixture and urea in an aqueous acetic acid medium containing from about 20 to 88 per cent by weight of acetic acid.

4. In the separation of a compound (I) having the capacity to form a crystalline complex with thiourea, from a mixture containing said compound (I) and a compound (II) incapable of forming a crystalline complex with thiourea, whereby said compound (I) preferentially forms a complex with thiourea, and wherein said complex and compound (II) are separated, the improvement which comprises: so contacting said mixture and thiourea in an aqueous acetic acid medium containing from about 20 to 88 per cent by weight of acetic acid.

5. In the separation of a hydrocarbon (I) having the capacity to form a crystalline complex with a complex-forming agent selected from the group consisting of urea and thiourea, from a mixture of hydrocarbons containing said hydrocarbon (I) and a hydrocarbon (II) incapable of forming a crystalline complex with the same said agent, whereby said hydrocarbon (I) preferentially forms a complex with said agent, and wherein said complex and hydrocarbon (II) are separated, the improvement which comprises: so contacting said mixture and said agent in solution in an aqueous acetic acid medium containing from about 20 to about 88 per cent by weight of acetic acid.

6. The method of forming a crystalline complex of a compound (I) having the capacity to form a crystalline complex with a complex-forming agent selected from the group consisting of urea and thiourea, which comprises: contacting said compound (I) with said agent in an aqueous acetic acid medium determined by those containing from about 20 per cent by weight of acetic acid to about 70 per cent by weight when said contact is affected at about 10° C., to about 88 per cent by weight when said contact is affected at about 25° C., and to 100 per cent by weight when said contact is affected at about 40° C.

7. The method of forming a crystalline complex of a compound (I) having the capacity to form a crystalline complex with urea, which comprises: contacting said compound (I) with urea in an aqueous acetic acid medium containing from about 20 to 88 per cent by weight of acetic acid.

8. The method of forming a crystalline complex of a compound (I) having the capacity to form a crystalline complex with thiourea, which comprises: contacting said compound (I) with thiourea in an aqueous acetic acid medium containing from about 20 to 88 per cent by weight of acetic acid.

9. The method of forming a crystalline complex of a compound (I) having the capacity to form a crystalline complex with a complex-forming agent selected from the group consisting of urea and thiourea, which comprises: contacting said compound (I) with said agent in an aqueous organic acid medium having a hydrogen ion concentration from about $10^{-3}$ to about $10^{-1}$.

10. In the separation of a compound (I) having the capacity to form a crystalline complex with a complex-forming agent selected from the group consisting of urea and thiourea, from a mixture containing said compound (I) and a compound (II) incapable of forming a crystalline complex with the same said agent, whereby said compound (I) preferentially forms a complex with said agent, and wherein said complex and compound (II) are separated, the improvement which comprises: so contacting said mixture and said agent in an aqueous organic acid medium having a hydrogen ion concentration from about $10^{-3}$ to about $10^{-1}$.

ALFRED W. FRANCIS.

References Cited in the file of this patent

UNITED STATES PATENTS

| Number | Name | Date |
|---|---|---|
| 2,520,716 | Fetterly | Aug. 29, 1950 |
| 2,578,054 | Fetterly | Dec. 11, 1951 |

OTHER REFERENCES

Bengen, German Patent application O. Z. 12,438, March 18, 1940, U. S. publication date May 22, 1946; Urea Complex Digest.